United States Patent
Kang et al.

(10) Patent No.: US 9,292,551 B2
(45) Date of Patent: Mar. 22, 2016

(54) STORAGE DEVICE AND STREAM FILTERING METHOD THEREOF

(71) Applicants: Jeonguk Kang, Bucheon-si (KR);
Dawoon Jung, Hwaseong-si (KR);
Chanik Park, Hwaseong-si (KR)

(72) Inventors: Jeonguk Kang, Bucheon-si (KR);
Dawoon Jung, Hwaseong-si (KR);
Chanik Park, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/021,081

(22) Filed: Sep. 9, 2013

(65) Prior Publication Data
US 2014/0006428 A1 Jan. 2, 2014

Related U.S. Application Data

(63) Continuation of application No. 13/187,867, filed on Jul. 21, 2011, now abandoned.

(30) Foreign Application Priority Data

Aug. 31, 2010 (KR) .................. 10-2010-0084969

(51) Int. Cl.
*G06F 17/30* (2006.01)

(52) U.S. Cl.
CPC .... *G06F 17/30312* (2013.01); *G06F 17/30516* (2013.01)

(58) Field of Classification Search
None
See application file for complete search history.

(56) References Cited

U.S. PATENT DOCUMENTS

| | | |
|---|---|---|
| 7,889,651 B2 * | 2/2011 | Feng et al. ............ 370/230 |
| 8,321,560 B1 | 11/2012 | Pai et al. |
| 2006/0212685 A1 | 9/2006 | Raghavan et al. |
| 2008/0243979 A1 | 10/2008 | Cherkauer et al. |
| 2008/0270403 A1 | 10/2008 | Bookman et al. |
| 2008/0294802 A1 | 11/2008 | Kohinata et al. |
| 2008/0320241 A1 * | 12/2008 | Dees et al. ............ 711/151 |
| 2009/0150873 A1 * | 6/2009 | Taneda ............ 717/148 |
| 2009/0281784 A1 | 11/2009 | Augusteijn et al. |
| 2010/0082648 A1 * | 4/2010 | Potapov et al. ............ 707/756 |
| 2011/0040771 A1 | 2/2011 | Gilyadov et al. |
| 2011/0131198 A1 | 6/2011 | Johnson et al. |
| 2011/0307724 A1 * | 12/2011 | Shaw et al. ............ 713/323 |

FOREIGN PATENT DOCUMENTS

| | | |
|---|---|---|
| JP | 2008-083808 A | 4/2008 |
| JP | 2008-293578 A | 12/2008 |
| JP | 2010-522915 A | 8/2010 |
| KR | 10-2005-0064281 A | 6/2005 |
| KR | 10-2008-0103402 A | 11/2008 |
| KR | 10-2009-0106476 A | 10/2009 |
| WO | WO 2008/116771 A1 | 10/2008 |

OTHER PUBLICATIONS

Pitkänen, Teemu, et al., "Parallel Memory Architecture for Application-Specific Instruction-Set Processors," J. Sign Process Syst, 57:21-32 (2009).

* cited by examiner

*Primary Examiner* — Rehana Perveen
*Assistant Examiner* — Raheem Hoffler
(74) *Attorney, Agent, or Firm* — Lee & Morse, P.C.

(57) ABSTRACT

A storage device may include a main storage part including memories; and a controller configured to control an overall operation of the main storage part. The controller includes a filter manager configured to store data format information and a filtering condition provided from a host; stream filters configured to search and project data stored in the memories in parallel in response to a control of the filter manager to produce searched and projected data; and a merge filter configured to merge the searched and projected data of the stream filters in response to the control of the filter manager.

21 Claims, 10 Drawing Sheets

STORAGE DEVICE AND STREAM FILTERING METHOD THEREOF

CROSS-REFERENCE TO RELATED APPLICATIONS

This is a continuation application based on pending application Ser. No. 13/187,867, filed Jul. 21, 2011, the entire contents of which is hereby incorporated by reference. This application claims the benefits, under 35 U.S.C §119, of Korean Patent Application No. 10-2010-0084969 filed Aug. 31, 2010, the entirety of which is incorporated by reference herein.

BACKGROUND

1. Field

Exemplary embodiments relate to a data storage device. More particularly, embodiments relate to a semiconductor memory-based storage device and a stream filtering method thereof.

2. Description of the Related Art

Semiconductor memory devices may be divided into volatile semiconductor memory devices and non-volatile semiconductor memory devices. Volatile semiconductor memory devices may perform read and write operations at a high speed, but lose stored contents at power-off. On the other hand, non-volatile semiconductor memory devices may retain stored contents even at power-off. Non-volatile semiconductor memory devices may be used as memory. The memory stores contents that will be maintained regardless of whether power is supplied.

Non-volatile semiconductor memory devices may include a mask read-only memory (MROM), a programmable read-only memory (PROM), an erasable programmable ROM (EPROM), an electrically erasable programmable ROM (EEPROM), etc.

Among non-volatile semiconductor memory devices, flash memory may be widely used as an audio and image data storing media of user devices, i.e., a computer, a cellular phone, PDA, a digital camera, a camcorder, a voice recorder, an MP3 player, a handheld PC, a game machine, a facsimile, a scanner, a printer, etc. Hereinafter, user devices will be called hosts.

Flash memory, for example, can be formed to have a removable card type, i.e., a multimedia card, a security digital card, a smart media card, a compact flash card, etc. Flash memory can be included as main storage device within an USB memory, a solid state drive (SSD), etc. Storage devices including flash memory may be inserted or detached in or from host according to a user request.

SUMMARY

Embodiments are directed to data storage devices.

One embodiment may be directed to a stream filtering method of a storage device which comprises setting up a filter manager with data format information and a filtering condition provided from a host; searching and projecting data corresponding to the filtering condition from memories in parallel by stream filters according to a control of the filter manager to produce search and projected data; merging the searched and projected data at the stream filters according to the control of the filter manager; and providing the merged result to the host.

The stream filtering method further comprises performing a predetermined operation on the searched and projected data by the stream filters according to the control of the filter manager.

The stream filtering method further comprises merging results calculated by the stream filters into one value by a merge filter according to the control of the filter manager.

The stream filtering method further comprises configuring a virtual index on the searched and projected data by the stream filters according to the control of the filter manager.

The stream filtering method further comprises merging the virtual index configured by the stream filters by a merge filter according to a control of the filter manager.

The data format information supports a Relational Database Management System (RDBMS) table format.

The filtering condition comprises an operator, a field to be compared with data stored in the memories, and field information to be provided as a filtering condition result.

The searching and projecting data corresponding to the filtering condition from memories in parallel is performed to produce the searched and projected data independently with respect to the memories each corresponding to the stream filters.

Another embodiment may be directed to a storage device which comprises a main storage part including memories; a controller configured to control an overall operation of the main storage part, wherein the controller comprises a filter manager configured to store data format information and a filtering condition provided from a host; stream filters configured to search and project data stored in the memories in parallel in response to a control of the filter manager to produce searched and projected data; and a merge filter configured to merge the searched and projected results of the stream filters in response to the control of the filter manager.

Each of the stream filters comprises a selection unit selecting searched data corresponding to the filtering condition among the data stored in a corresponding memory according to the control of the filter manager; a projection unit projecting projected data corresponding to the filtering condition among the data stored in the corresponding memory according to the control of the filter manager; and an aggregation unit combining or calculating searched data and projected data from the selection unit and the projection unit into a merged result according to the control of the filter manager.

The merge filter re-calculates results from the stream filters so as to be merged into one value, under the control of the filter manager.

Each of the stream filters configures a virtual index on the searched and projected data of each of the stream filters under the control of the filter manager.

The merge filter merges the virtual index configured by the stream filters under the control of the filter manager.

The merge filter merges the virtual index configured by the stream filters under the control of the filter manager.

The filter manager, the stream filters, and the merge filter are formed by hardware within the controller.

The data format information and the filtering condition are freely set up by the host.

Still another embodiment may be directed to a stream filtering method of a storage device, which comprises setting up a filter manager with data format information and a filtering condition provided from a host; searching and projecting data corresponding to the filtering condition from memories in parallel by stream filters according to a control of the filter manager to produce searched and projected data; updating the searched and projected data at the stream filters according to the control of the filter manager to produce updated searched and projected data; and storing the updated searched and projected data in a memory corresponding to the updated searched and projected data among the memories according to the control of the filter manager.

The searched and projected data is updated without a transfer to the host.

Yet another embodiment may be directed to a storage device which comprises a flash memory, a buffer for temporarily storing buffer data generated during an operation, and a memory controller for controlling the flash memory and the buffer, wherein the memory controller includes a filter manager configured to store data format information and a filtering condition provided from a host, a flash interface which includes stream filters configured to search and project data stored in memory controller memories in parallel in response to a control of the filter manager to produce searched and projected data, at least one microprocessor, and a host interface which includes a merge filter configured to merge the searched and projected data of the stream filters in response to the control of the filter manager.

BRIEF DESCRIPTION OF THE DRAWINGS

The above and other features will become more apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein.

The terminology used herein is for the purpose of describing particular embodiments only and is not intended to be limiting of present embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of other features, integers, steps, operations, elements, components, and/or groups thereof. As used herein, the term "and/or" includes any and all combinations of the associated listed items.

It will be understood that when an element or layer is referred to as being "on" another element or layer, it can be directly on the other element or layer, or intervening elements or layers may be present. In contrast, when an element is referred to as being "directly on" another element or layer, there are no intervening elements or layers present.

A solid state drive (SSD) adopting a flash memory among semiconductor memories as a main storage device will be described as a storage device. However, a storage device and a data storing method thereof may be applied to a different-type storage device (e.g., a memory card, etc.) as well as the SSD.

Figure 1:
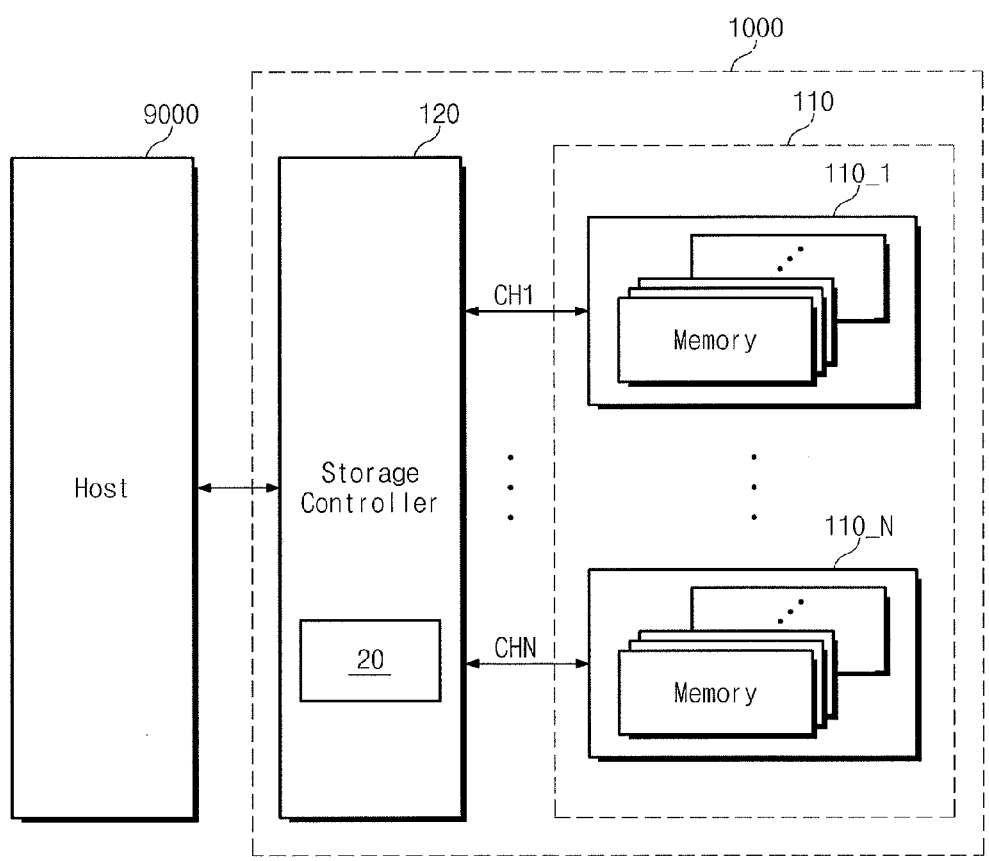
FIG. 1 illustrates a diagram showing a storage device according to an exemplary embodiment and a user device including the same.

FIG. 1 is a diagram showing a storage device according to an exemplary embodiment and a user device including the same.

Referring to FIG. 1, a user device may include a host 9000 and a storage device 1000. The host 9000 may be configured to control the storage device 1000. The host 9000 may include a user device such as a personal/portable computer, a personal digital assistant (PDA), an MP3 player, etc. The host 9000 and the storage device 1000 may be interconnected by a standardized interface such as an USB, SCSI, ESDI, SATA, SAS, PCI-express, or IDE interface. An interface manner for connecting the host 9000 and the storage device 1000 is not limited to this disclosure, and could be configured in a different manner.

The storage device 1000 may be formed of a solid state drive (or, a solid state disk). Hereinafter, the solid state drive will be referred to as a SSD. The storage device 1000 is formed of a SSD. But, the storage device 1000 is not limited to this disclosure, and could be formed differently. For example, the storage device 1000 may be integrated in one semiconductor device to form a personal computer memory card international association (PCMCIA), a compact flash (CF), a smart media card (SM, SMC), a memory stick, a multimedia card (MMC, RS-MMC, MMC-micro), an SD card (SD, miniSD, microSD, SDHC), an universal flash storage (UFS) device, etc.

The storage device 1000 may include a storage controller 120 and a main storage part 110. A plurality of channels CH1 to CHN may be formed between the storage controller 120 and the main storage part 110.

The main storage part 110 may be formed of a plurality of non-volatile memory chips, i.e., a plurality of flash memories 110_1 to 110_N. Each of the channels CH1 to CHN may be connected in common with a plurality of flash memories. As another example, the main storage part 110 may be formed of different-type non-volatile memory chips (e.g., PRAM, FRAM, MRAM, etc.) instead of flash memory chips. Alternatively, the main storage part 110 can be formed of volatile memories, i.e., DRAM or SRAM, and may have a hybrid type where two or more types of memories are mixed.

The storage controller 120 may control a read/write/erase operation of the main storage part 110 in response to a request from the host 9000. A parallel stream filter 20 may be provided within the storage controller 120 such that a predetermined data processing function is carried out by the storage device 1000 instead of the host 9000. The parallel stream filter 20 may be configured in hardware within the storage controller 120. A data processing operation executed by the parallel stream filter 20 is called a stream filtering operation.

The parallel stream filter 20 may make data processing in parallel via a plurality of stream filters within the storage device. Data processing results of the plurality of stream filters may be merged effectively by a merger filter. A parallel data processing operation of the parallel stream filter 20 may be applied to an operation of writing data in the main storage part 110 as well as an operation of reading data from the main storage part 110. With a configuration of the parallel stream filter 20, a data processing function may be executed effectively within the storage device 1000 instead of the host 9000. This enables the burden of the host 9000 associated with data processing to be reduced.

Figure 2:
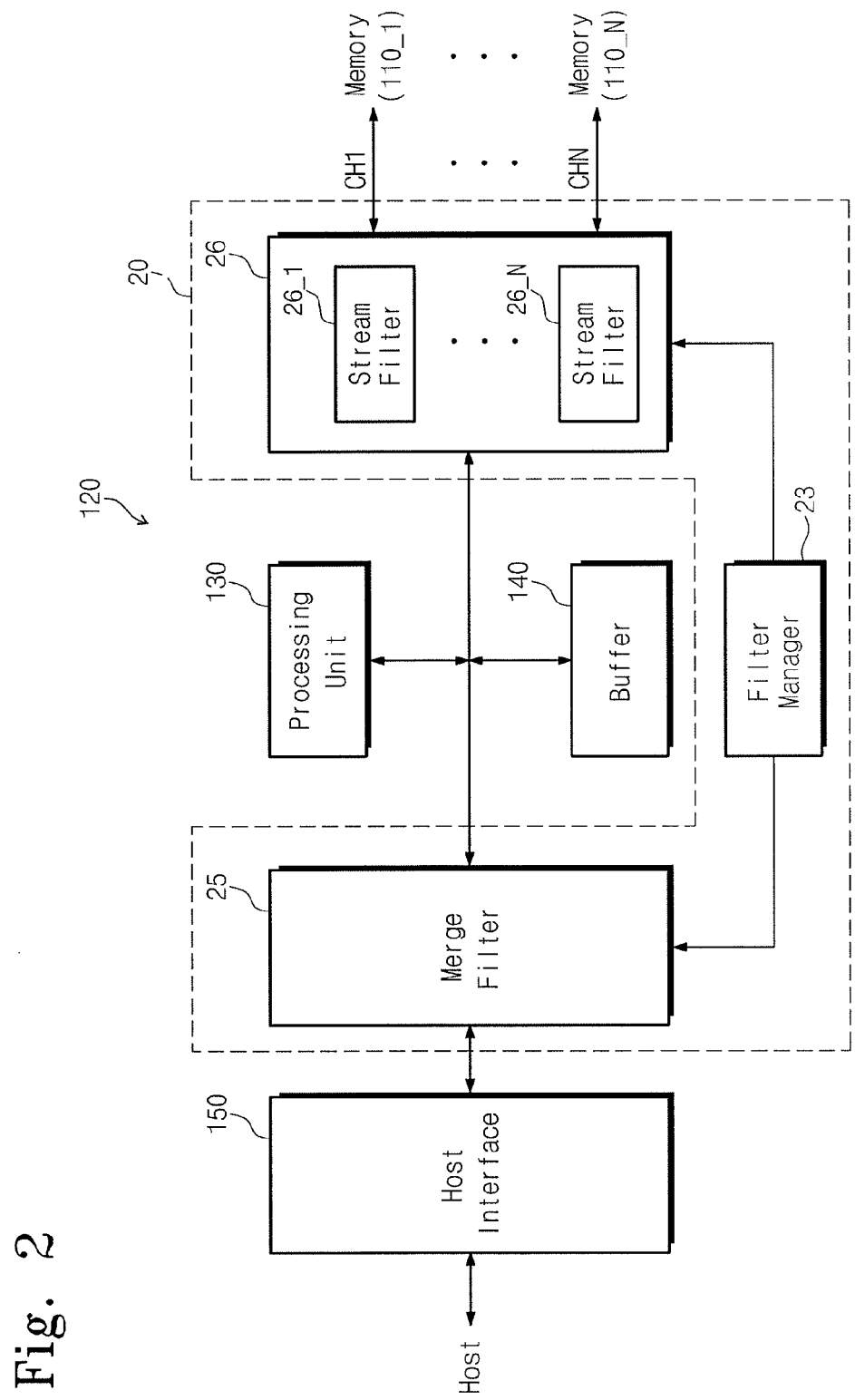
FIG. 2 illustrates a diagram showing a storage controller illustrated in FIG. 1.

FIG. 2 is a diagram showing a storage controller illustrated in FIG. 1.

Referring to FIG. 2, a storage controller 120 may be an SSD controller if a storage device 1000 is an SSD. The storage controller 120 may include a host interface 150, at least one processing unit 130, a buffer 140, and a parallel stream filter 20. The storage controller 120 illustrated in FIG. 2 is related to an exemplary embodiment and may be changed and modified. For example, although not shown in FIG. 2, the storage controller 120 may further comprise a flash interface circuit, an ECC circuit for detecting and correcting errors of data read out from a main storage part 110, etc.

The host interface 150 may be configured to interface with the host 9000. The processing unit 130 may be configured to control an overall operation of the storage controller 120. In an exemplary embodiment, the processing unit 130 may be a commercial or custom-made microprocessor.

The buffer 140 may be general purpose memory devices which include software for operating the storage device 120 and data. The buffer 140 may include a cache, ROM, PROM, EPROM, EEPROM, PRAM, flash memory, SRAM, and DRAM. Further, the buffer 140 may be used to temporarily store data to be stored in or read out from the main storage part 110 and to temporarily store data processed by the parallel stream filter 20.

The parallel stream filter 20 may include a filter manager 23, a merge filter 25, and stream filters 26. The filter manager 23 may control the merger filter 25 and the stream filter 26 based on a data format and a data process request, executed according to the data format, from the host 9000.

In an exemplary embodiment, the stream filter 26 may be provided to correspond to each of a plurality of channels CH1 to CHN formed between the storage controller 120 and the main storage part 110. For example, if N channels are formed between the storage controller 120 and the main storage part 110, N stream filters 26_1 to 26_N may be provided. In this case, the N stream filters 26_1 to 26_N may be implemented to have the same configuration one another.

The N stream filters 26_1 to 26_N may perform a filtering operation independently with respect to the respective channels CH1 to CHN, and filtering operations of the N stream filters 26_1 to 26_N may be executed in parallel according to the control of the filter manager 23. In an exemplary embodiment, the N stream filters 26_1 to 26_N may be formed within a flash interface circuit which makes interface with a plurality of flash memories 110_1 to 110_N via the N channels CH1 to CHN. However, the location and configuration of the stream filter 26 may be modified and changed, and is not limited to this disclosure. N filtering results obtained by the parallel processing of the N stream filters 26_1 to 26_N may be stored in the buffer 140.

The merge filter 25 may execute a function of merging filtering results of the N stream filters 26_1 to 26_N temporarily stored in the buffer 140. A merge operation of the merger filter 25 may be executed under the control of the filter manager 23. In an exemplary embodiment, the merge filter 25 may be implemented within a host interface circuit 150 which makes interface with the host 9000. However, the location and configuration of the merge filter 25 may be modified and changed, and is not limited to this disclosure.

Figure 3:
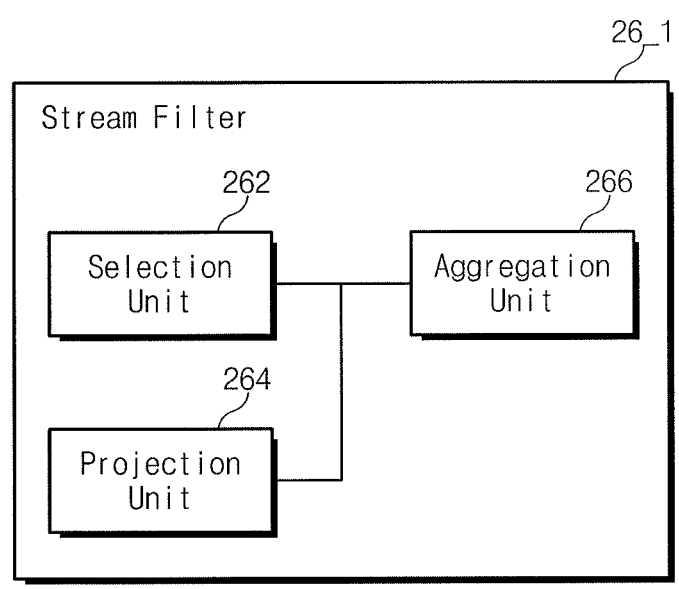
FIG. 3 illustrates a diagram showing a stream filter illustrated in FIG. 2.

FIG. 3 is a diagram showing a stream filter illustrated in FIG. 2. In FIG. 3, there is illustrated one stream filter 26_1 of a plurality of, for example, N stream filters 26_1 to 26_N in FIG. 2. The N stream filters 26_1 to 26_N may be formed to have the same configuration.

Referring to FIG. 3, the stream filter 26_1 may include a selection unit 262, a projection unit 264, and an aggregation unit 266. The selection unit 262 may select data corresponding to a predetermined condition among data stored in flash memories 110_1 according to the control of the filter manager 23. The projection part 264 may extract data corresponding to a predetermined condition among data stored in flash memories 110_1 according to the control of the filter manager 23.

Under the control of the filter manager 23, the aggregation unit 266 may combine or calculate the selected and/or extracted results of the selection unit 262 and the projection unit 264 may convert a required field of a plurality of records into one value.

As illustrated in FIG. 2, in the event that a parallel stream filter 20 may include N stream filters 26_1 to 26_N each corresponding to N channels CH1 to CHN, N outputs may be generated in parallel from the N stream filters 26_1 to 26_N. N outputs generated in parallel from aggregation units 266 in the N stream filters 26_1 to 26_N may be stored in a buffer 140 temporarily. The N outputs temporarily stored in the buffer 140 may be merged by the merge filter 25 according to the control of the filter manager 23.

The parallel stream filter 20 may execute a stream filtering operation in which a data processing operation of a host 9000 is partially executed directly within a storage device 1000 instead of the host 9000. With the stream filtering operation, it is possible to skip an operation of transferring data in the main storage part 110 of the storage device 1000 into the host 9000, a data processing operation of the host 9000, and an operation of storing a processed result provided from the host 9000 in the main storage part 110 by the storage device 1000. A data processing operation executed by the parallel stream filter 20 may be made at an operation of reading data from the main storage part 110 or at an operation of writing data therein.

Figure 4:
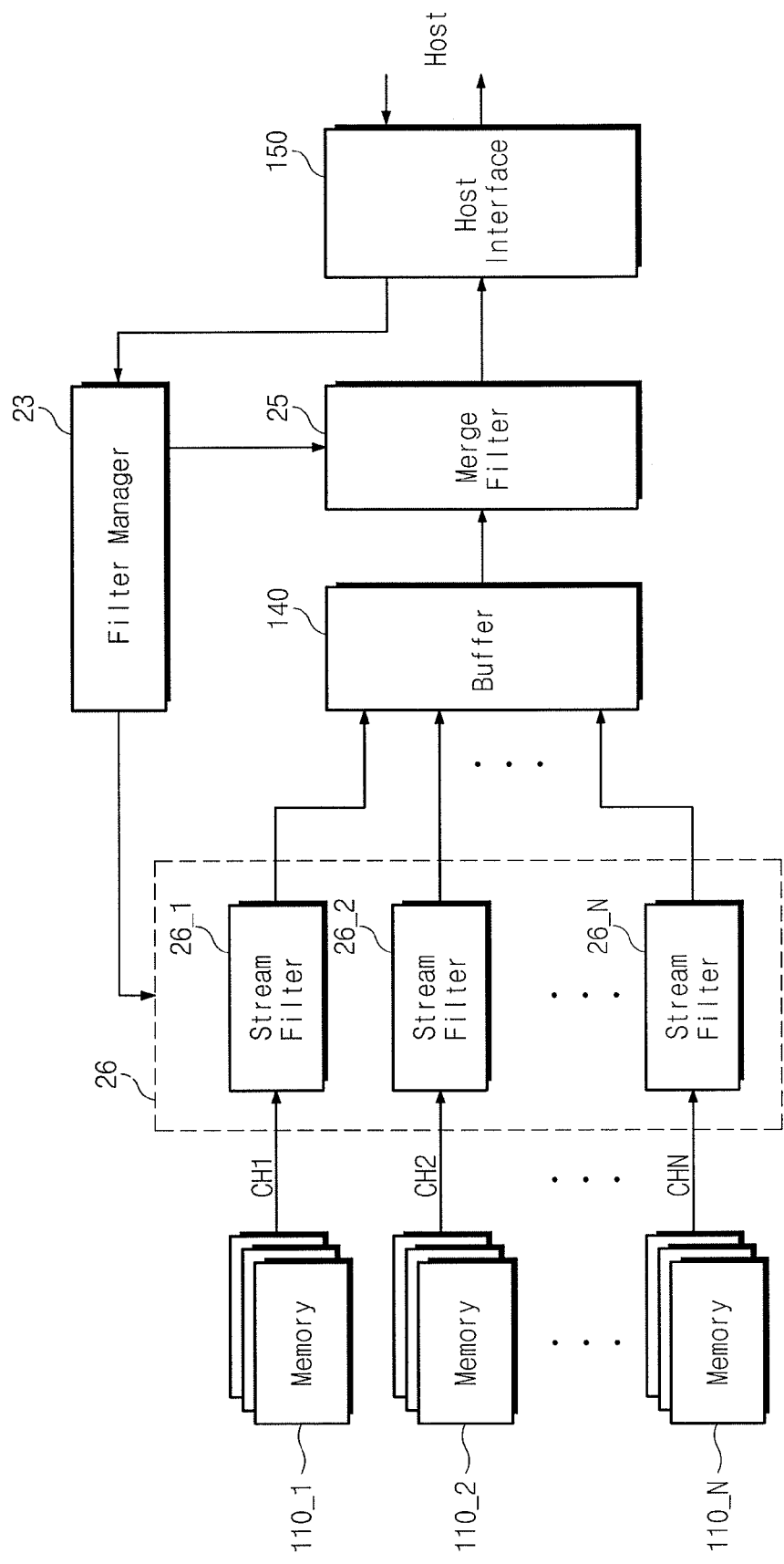
FIG. 4 illustrates a diagram for showing an operation of a parallel stream filter according to an exemplary embodiment when data stored in a main storage part is read out.

FIG. 4 is a diagram for describing an operation of a parallel stream filter according to an exemplary embodiment when data stored in a main storage part is read out.

Referring to FIG. 4, a filter manager 23 of the parallel stream filter 20 may be set with two types of information to perform a data processing operation requested from the host 9000. The setting of the filter manager 23 may be made under the control of the host 9000.

The first type of information of the filter manager 23 may include a format of data stored in a storage device. For example, in case of RDBMS (Relational Database Management System), the first type of information means information on a format of a table where data is stored. Such information may represent the number of table columns or fields per row. A size of each column or field may be defined by such information.

Figure 5:
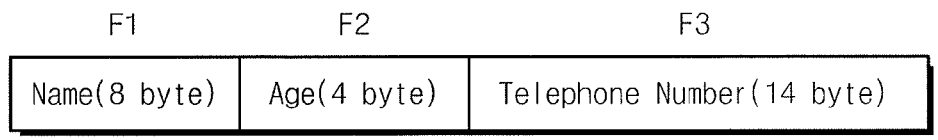
FIG. 5 illustrates a diagram showing a data format of a filter manager being set by a host.

FIG. 5 is a diagram showing a data format of a filter manager being set by a host.

In FIG. 5, there is illustrated an example that three fields F1 to F3 are set within the filter manager 23 by a host. For example, 8-byte may be assigned to the first field F1 as a record or tuple representing "Name". 4-byte may be assigned to the second field F2 as a record or tuple representing "Age", and 14-byte may be assigned to the third field F3 as a record or tuple representing "Telephone Number". At this time, a field format and a field length may be set variously by the host 9000. If the filter manager 23 is set with a format of a table storing data like a format illustrated in FIG. 5, data of the main storage part 110 may be searched or stored according to the set table format.

The second type of information of the filter manager 23 may represent a condition needed to execute a filtering operation. The filtering information may include a field being an object to be compared among data stored in the main storage part 110 and field information to be provided as a result. Herein, it is possible to freely set up the data format information and filtering condition by the host 9000.

For example, as illustrated in FIG. 5, to search a telephone number of a person named "AA" within a table storing a name, an age, and a telephone number as a record or tuple, the host 9000 may set up the filter manager 23 with a record format of a table being <8 Bytes, 4 Bytes, 14 Bytes>. And then, the host 9000 may set up the filter manager 23 with a filtering condition of <F1=="AA", F3>. This condition represents a message such as send an output of the third field F3 when a value of the first field F1 has "AA".

After set up with the filtering condition of <F1=="AA", F3>, the filter manager 23 may search a telephone number corresponding to a name "AA" from N memories 110_1 to 110_N each corresponding to N channels CH1 to CHN via N stream filters 26_1 to 26_N.

Figure 6:
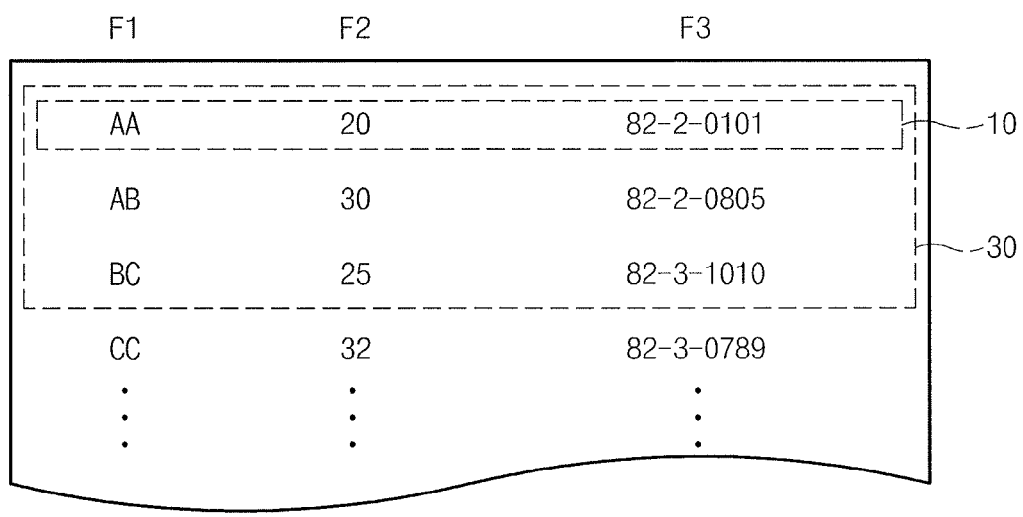
FIG. 6 illustrates a diagram for showing a parallel stream filtering operation according to a filtering condition of a filter manager being set by a host.

FIG. 6 is a diagram for describing a parallel stream filtering operation according to a filtering condition of a filter manager being set by a host.

Referring to FIGS. 4 and 6, under the control of a filter manager 23, N stream filters 26_1 to 26_N perform a stream filtering operation in parallel to search a telephone number corresponding to a name being "AA" (refer to 10, in FIG. 6). Searched results of the N stream filters 26_1 to 26_N may be stored in the buffer 140 temporarily. The merge filter 25 may merge outputs of the N stream filters 26_1 to 26_N temporarily stored in the buffer 140 under the control of the filter manager 23. A merge result of the merge filter 25 may be provided to a host 9000 via a host interface 150.

With the stream filtering operation, it is possible to search data satisfying a predetermined condition directly from N memories 110_1 to 110_N, in which data to be searched is stored, in parallel via N stream filters 26_1 to 26_N. Results searched in parallel by the N stream filters 26_1 to 26_N may be merged by the merge filter 25 such that only a desired result is finally provided to the host 9000. A parallel stream filter 20 may search data within the storage device 1000 storing data to be searched and provide the searched data to the host 9000 as desired data. Thus, it is possible to reduce a burden of the host 9000 by performing a data search operation by the storage device 1000 instead of the host 9000. Further, it is possible to reduce an unnecessary data transfer between the storage device 1000 and the host 9000. In particular, since a plurality of stream filters 26_1 to 26_N in the parallel stream filter 20 performs stream filtering operations in parallel, a filtering speed may be improved and power consumption may be minimized.

The N stream filters 26_1 to 26_N may further provide an aggregation function together with the above-described selection function and projection function for extracting a desired field from a corresponding record. The aggregation function may be executed by an aggregation unit 266 in each of the stream filters 26_1 to 26_N. For example, each stream filter may search a field satisfying a predetermined condition, and the aggregation unit 266 may calculate the searched fields to be converted into one value. With the aggregation function, it is possible to provide the number of specific records, a total of desired fields, an average of desired fields, etc.

For example, it is assumed that the host 9000 may need an average age of persons over age 30. This will be more fully described with reference to a data format illustrated in FIG. 5. First of all, the host 9000 may notify a filter manager 23 that a record format is <8 Bytes, 4 Bytes, 14 Bytes>. Then, the host 9000 may set up the filter manager 23 with a filtering condition of <F2>=30, F2, AVERAGE>. The filtering condition may represent "Obtain an average of the second field F2 when a value of the second field F2 is identical to or more than 30".

At this time, each of the stream filters 26_1 to 26_N may provide an average value on data stored in a corresponding memory 111_i (i being 1 to N). Accordingly, the N stream filters 26_1 to 26_N may output average values on the N memories 110_1 to 110_N in parallel. The N average values provided in parallel from the N stream filters 26_1 to 26_N may be temporarily stored in a buffer 140.

The merge filter 25 may merge the N average values temporarily stored in the buffer 140 under the control of the filter manager 23 to generate a final average value. The final average value generated by the merge filter 25 may be provided to the host 9000 by the host interface 150. In this case, basic and statistics operations for obtaining the final average value may be provided to the merge filter 25.

The merge filter 25 may further provide a virtual index configuring function together with such a function that a final result is generated by merging N stream filtering results provided from the N stream filters 26_1 to 26_N.

The virtual index may mean a function of temporarily configuring an index for rapidly searching specific data later. The merge filter 25 may merge index information configured with respect to data stored in respective memories 110_1 to 110_N each corresponding to the stream filters 26_1 to 26_N and notify the host 9000 of final index information on data overall stored in the storage device 1000.

For example, it is assumed that the host 9000 needs a telephone number from persons below age 30. This may be accomplished as follows. First of all, an index may be made with respect to data stored in memories 110_1 to 110_N each corresponding to the stream filters 26_1 to 26_N. In this case, ages of persons below age 30 may be used as a key of the index (refer to 30 in FIG. 6). For this, the host 9000 may set up the filter manager 23 with information of <F2<=30, F3, VIRTUAL INDEX, F2>. The information may represent "Provide the third field F3 when a value of the second field F2 is identical to or less than 30" and Configure a virtual index using the second field F2 as a key. Each of the stream filters 26_1 to 26_N may configure a virtual index using the second field F2 as a key according to the control of the filter manager 23. Virtual indexes configured by the stream filters 26_1 to 26_N may be merged by the merge filter 25, so that final index information on data overall stored in the storage device 1000 is configured. The final index information configured by the merge filter 25 may be provided to the host 9000 by the host interface 150.

A stream filtering operation of the parallel stream filter 20 is exemplarily described under the assumption that data stored in the main storage part 110 is read out and provided to the host 9000. However, the stream filtering operation of the parallel stream filter 20 may be applied to an operation of writing data in the storage device 1000 to process data en bloc.

Figure 7:
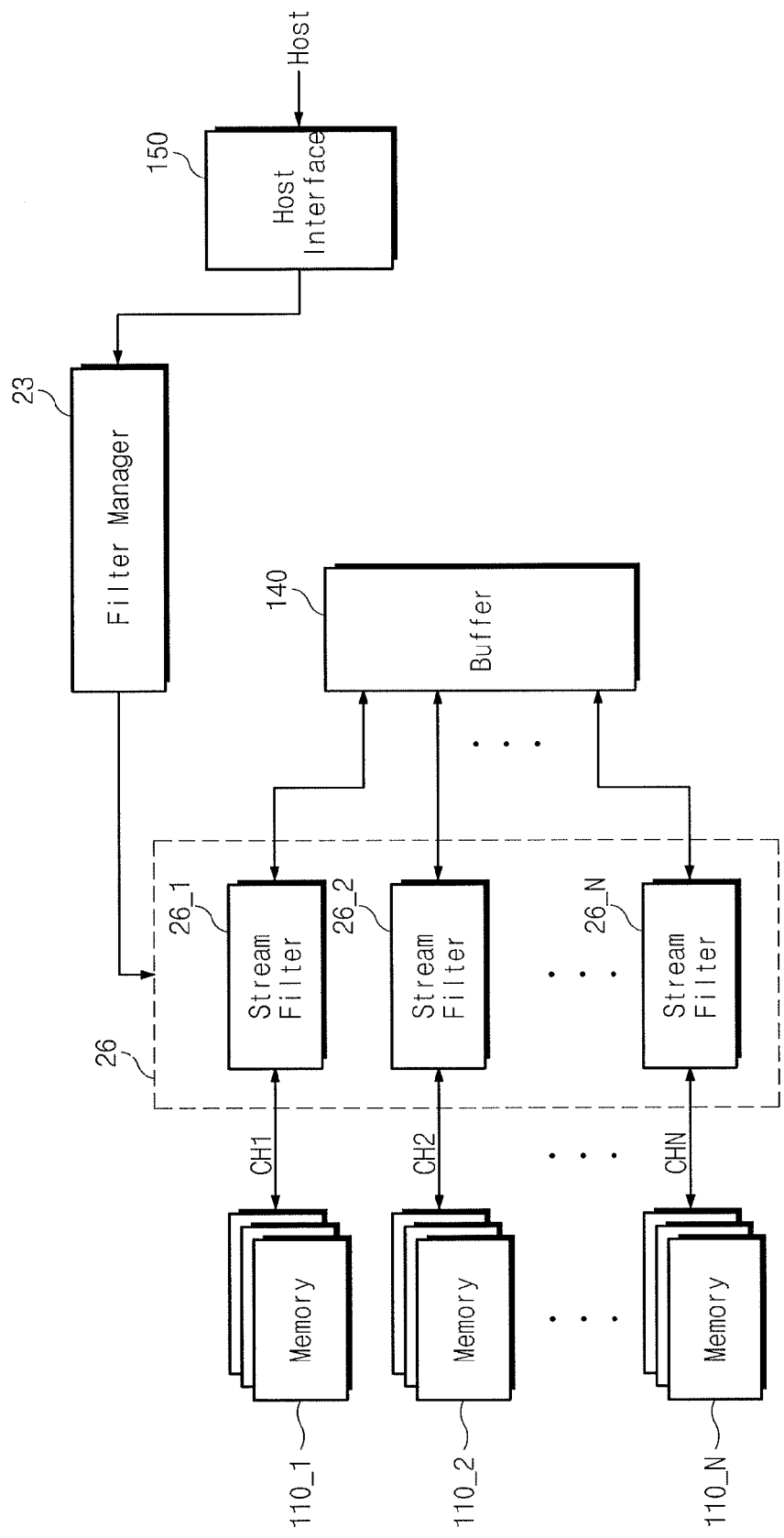
FIG. 7 illustrates a diagram for showing an operation of a parallel stream filter according to an exemplary embodiment when data is written in a main storage part.

FIG. 7 is a diagram for describing an operation of a parallel stream filter according to an exemplary embodiment when data is written in a main storage part.

Referring to FIG. 7, the parallel stream filter 20 may perform a stream filtering operation in which data stored in the main storage part 110 is directly processed by the parallel stream filter 20 and the processed result is directly stored in the main storage part 110 without the intervention of the host 9000. The host 9000 may set up the filter manager 23 with a stream filtering operation to be executed.

For example, referring to FIGS. 5 and 6, it is assumed that the host 9000 wants to change a telephone number of a person named "AA". In this case, the host 9000 may set up the filter manager 23 with information of <F1="AA", "UPDATE">. This may represent "Update a value of the third field F3 when a value of the first field F1 is "AA".

Referring to FIGS. 6 and 7, N stream filters 26_1 to 26_N may perform a stream filtering operation in parallel under the control of the filter manager 23, respectively. That is, the N stream filters 26_1 to 26_N may search a telephone number of a person named "AA" to update the searched telephone number with a new value. In this case, values searched and updated by the N stream filters 26_1 to 26_N may be stored in the buffer 140 temporarily. The result updated by a stream filter 26_i (i being 1 to N) may be stored in a corresponding memory 110_i.

With the above-described parallel stream filtering operation, search and update operations on a desired field may be carried out directly within the storage device 1000 without the intervention of the host 9000. Accordingly, it is possible to reduce the burden of the host 9000 and an unnecessary data transfer between the storage device 1000 and the host 9000, by processing a data search operation of the host 9000 within the storage device 1000.

Figure 8:
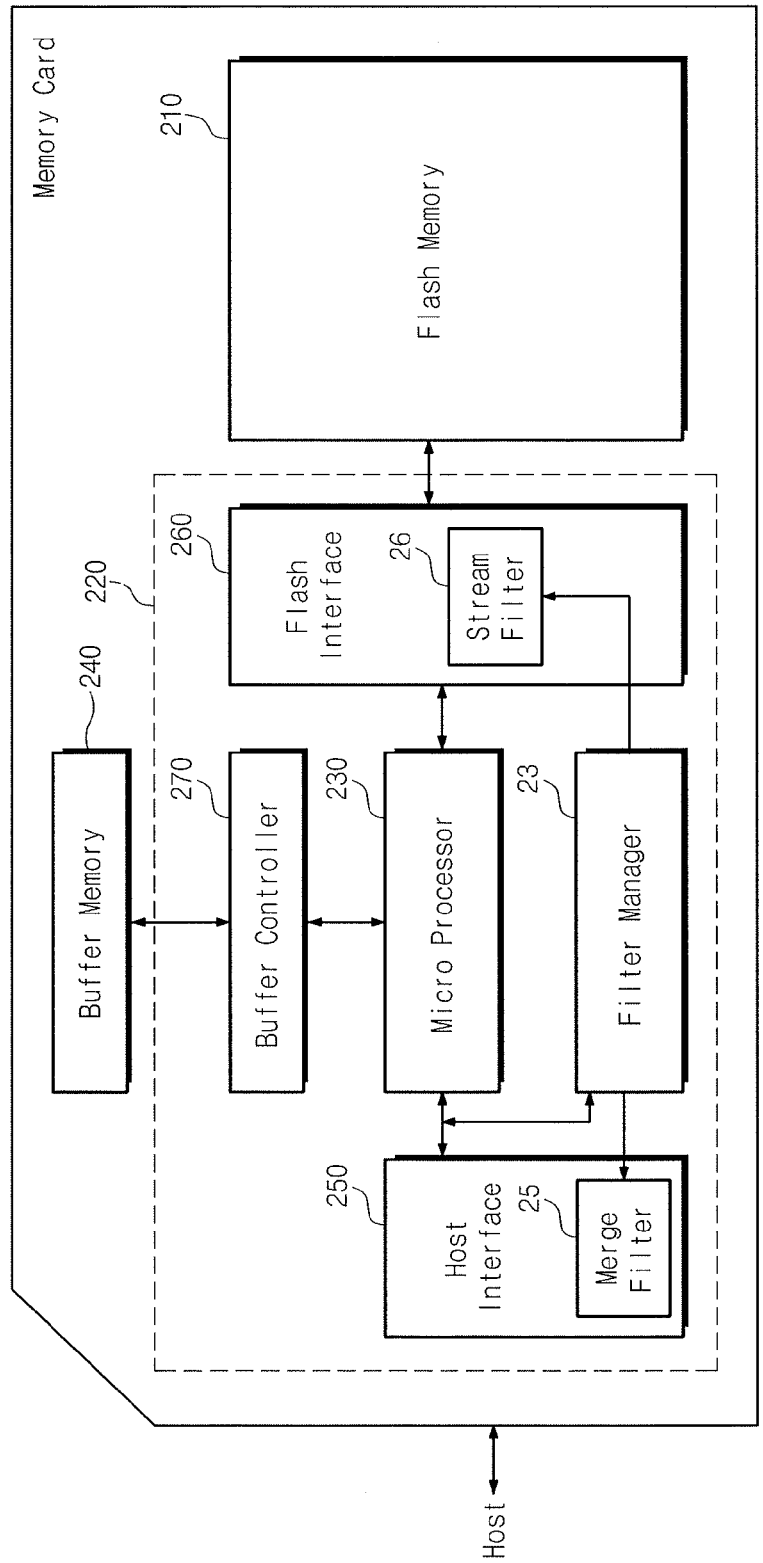
FIG. 8 illustrates a diagram showing a storage device according to an exemplary embodiment.

An operation of the parallel stream filter 20 is exemplarily described using the RDBMS table as an example. However, it is well understood that the parallel stream filter 20 is applied to all field-based data structures FIG. 8 is a diagram showing a storage device according to an exemplary embodiment. In FIG. 8, there is exemplarily illustrated a storage device 2000 in FIG. 8 that forms a flash memory card.

Referring to FIG. 8, the storage device 2000 may include a flash memory 210, a buffer 240, and a memory controller 220 for controlling the flash memory 210 and the buffer 240. The buffer 240 may be a device which temporarily stores data generated during an operation of the storage device 2000. The buffer 240 may be implemented by DRAM or SRAM. The memory controller 220 may be configured to control erase, read, and write operations of the flash memory 210.

The memory controller 220 may include at least one microprocessor 230, a host interface 250, a flash interface 260, and a buffer controller 270. The memory controller 220 may be configured to drive firmware for controlling the flash memory 210. The host interface 250 may interface with a host via the card protocol (e.g., the MMC protocol).

The memory controller 220 may further include a parallel stream filter which is formed of a filter manager 23, a merge filter 25, and a stream filter 26. In an exemplary embodiment, the merge filter 25 may be included in the host interface 250, and the stream filter 26 may be included in the flash interface 260. Further, the stream filter 26 may be configured to have the same constitution as illustrated in FIG. 3. In a case where the storage device 2000 includes a plurality of channels, the stream filter 26 may be provided to correspond to the plurality of channels, respectively.

Operations and constitutions of the filter manager 23, the merge filter 25, and the stream filter 26 may be identical to those described in FIGS. 1 to 7. Accordingly, identical constituent elements may be represented by the same reference numerals, and description thereof is thus omitted.

In accordance with a stream filtering operation of a parallel stream filter, search and update operations on a desired field may be carried out directly within a storage device 2000 without the intervention of a host. Accordingly, it is possible to reduce the burden of the host and an unnecessary data transfer between the storage device 2000 and the host, by processing a data search operation of the host within the storage device 2000.

The storage device 2000 may be applied to a multimedia card (MMC), a security digital card (SD, miniSD), a memory stick, a SmartMedia card, a TransFlash card, etc.

Figure 9:
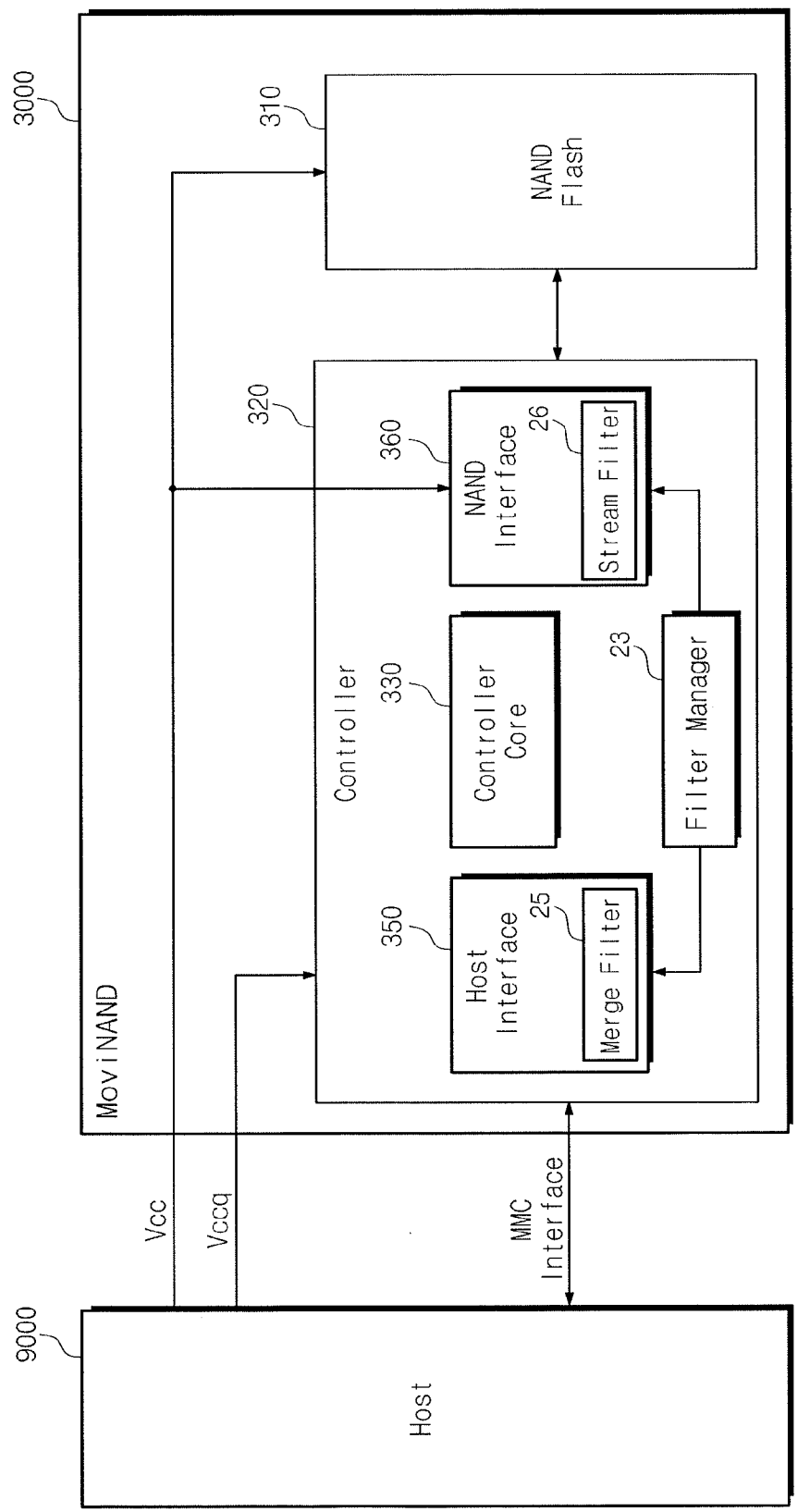
FIG. 9 illustrates a diagram showing a storage device according to another exemplary embodiment.

FIG. 9 is a diagram showing a storage device according to another exemplary embodiment. In FIG. 9, there is exemplarily illustrated an example that a storage device 3000 forms a moviNAND.

Referring to FIG. 9, a storage device 3000 may include a NAND flash memory 310 and a controller 320. The NAND flash memory 310 may be formed of NAND flash memories which are stacked within one package (e.g., FBGA, Fine-pitch Ball Grid Array, etc.).

The controller 320 may include at least one controller core 330, a host interface 350, and a NAND interface 360. The controller core 330 may be configured to control an overall operation of the moviNAND 3000. In an exemplary embodiment, the host interface 350 may be configured to make a MMC interface with the host 9000. It is well understood that the MMC interface may be changed into different interface manners. The NAND interface 360 may provide an interface between the NAND flash memory 310 and the controller 320.

In the event that the storage device 3000 forms the moviNAND, the storage device 3000 may be supplied with power supply voltages Vcc and Vccq from the host 9000. Herein, the power supply voltage Vcc (e.g., 3V) may be supplied to the NAND flash memory 310 and the NAND interface 360, and the power supply voltage Vccq (e.g., 1.8V/3V) may be supplied to the controller 320.

The controller 320 may further include a parallel stream filter which is formed of a filter manager 23, a merge filter 25, and a stream filter 26. In an exemplary embodiment, the filter manager 23 may be included in the host interface 350, and the stream filter 26 may be included in the flash interface 360. Further, the stream filter 26 may be configured to have the same configuration as FIG. 3. In a case where the storage device 3000 includes a plurality of channels, the stream filter 26 may be provided to correspond to the plurality of channels, respectively.

In FIG. 9, operations and constitutions of the filter manager 23, the merge filter 25, and the stream filter 26 may be identical to those described in FIGS. 1 to 7. Accordingly, identical constituent elements may be represented by the same reference numerals, and description thereof is thus omitted.

With a stream filtering operation of a parallel stream filter, search and update operations on a desired field may be carried out directly within a storage device 3000 without the intervention of a host 9000. Accordingly, it is possible to reduce the burden of the host 9000 and an unnecessary data transfer between the storage device 3000 and the host 9000, by processing a data search operation of the host 9000 within the storage device 3000.

Figure 10:
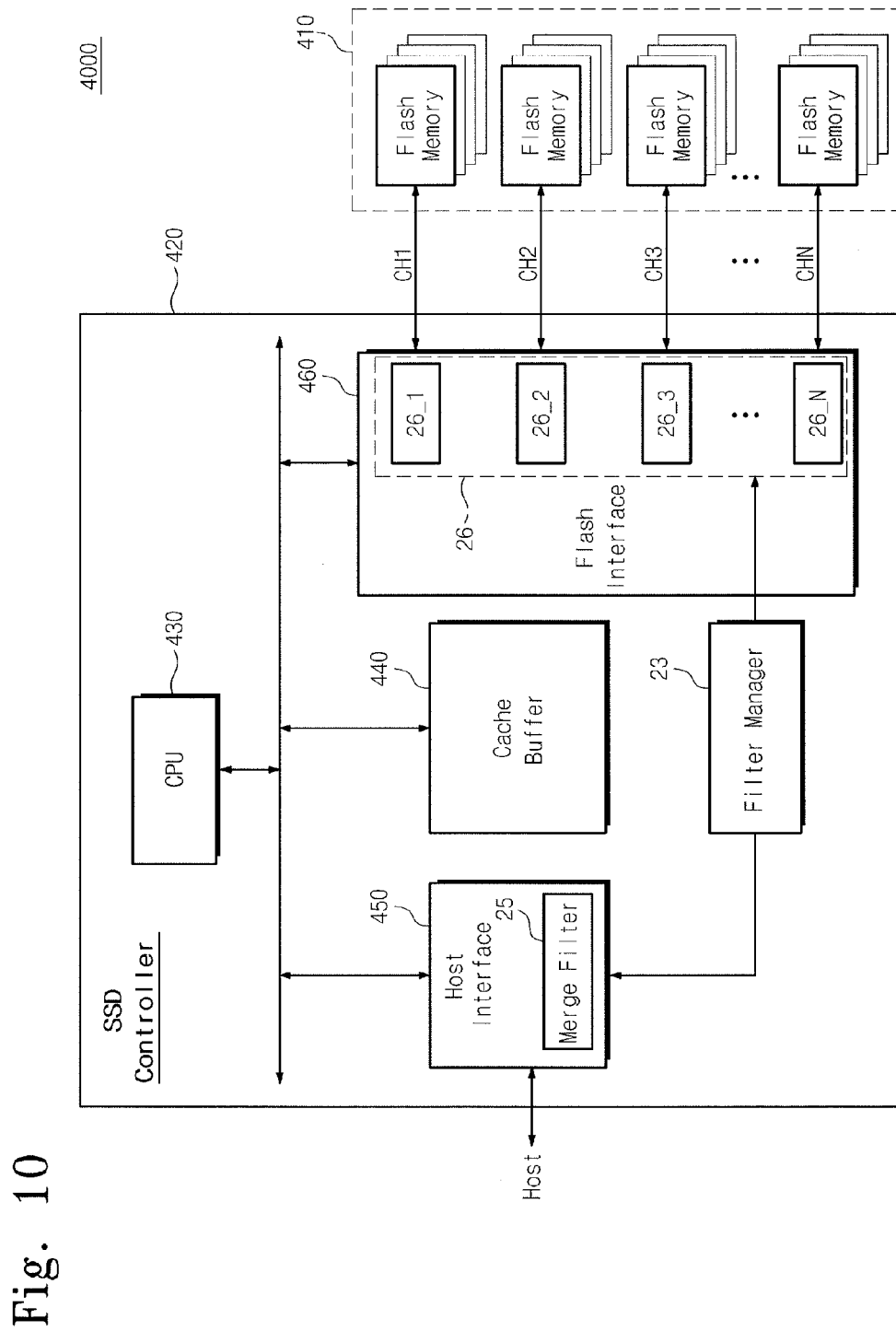
FIG. 10 illustrates a diagram showing a storage device according to yet another exemplary embodiment.

FIG. 10 is a diagram showing a storage device according to another exemplary embodiment. In FIG. 10, there is exemplarily illustrated an example that a storage device 4000 in FIG. 10 forms a solid state drive (SSD).

Referring to FIG. 10, the storage device 4000 may include a plurality of flash memories 410 and an SSD controller 420. Each of the plurality of flash memories 410 may be configured to be identical to that illustrated in FIG. 2.

The SSD controller 420 may include at least one CPU 430, a host interface 450, a cache buffer 440, and a flash interface 460. The host interface 450 may exchange data with a host in a standardized interface manner according to the control of the CPU 430.

Herein, the standardized interface manner may include ATA, SATA, SAS, PATA, USB, SCSI, ESDI, IEEE 1394, IDE, PCI-express, and/or a card interface.

Data provided from the host or to be sent thereto via the host interface 450 may be transferred to a cache buffer 440 without passing through a CPU bus under the control of the CPU 430.

The cache buffer 440 may store data transferred between an external device (e.g., a host) and the flash memories 410 temporarily. Further, the cache buffer 440 may be used to store programs to be executed by the CPU 430. The cache buffer 440 may be considered to be a type of buffer and formed of SRAM, etc.

The flash interface 460 may provide an interface between the flash memories 410 used as a main storage part and the SSD controller 420.

The SSD controller 420 may further include a parallel stream filter which is formed of a filter manager 23, a merge filter 25, and a stream filter 26. In an exemplary embodiment, the merge filter 25 may be included in the host interface 450, and the stream filter 26 may be included in the NAND interface 460. Further, the stream filter 26 may be configured to have the same configuration as FIG. 3. In a case where the storage device 4000 includes a plurality of channels, the stream filter 26 may be provided to correspond to the plurality of channels, respectively.

In FIG. 10, operations and constitutions of the filter manager 23, the merge filter 25, and the stream filter 26 may be identical to those described in FIGS. 1 to 7. Accordingly, identical constituent elements may be represented by the same reference numerals, and description thereof is thus omitted.

With a stream filtering operation of a parallel stream filter, search and update operations on a desired field may be carried out directly within a storage device 4000 without the intervention of a host. Accordingly, it is possible to reduce the burden of the host and an unnecessary data transfer between the storage device 4000 and the host, by processing a data search operation of the host within the storage device 4000.

Figure 11:
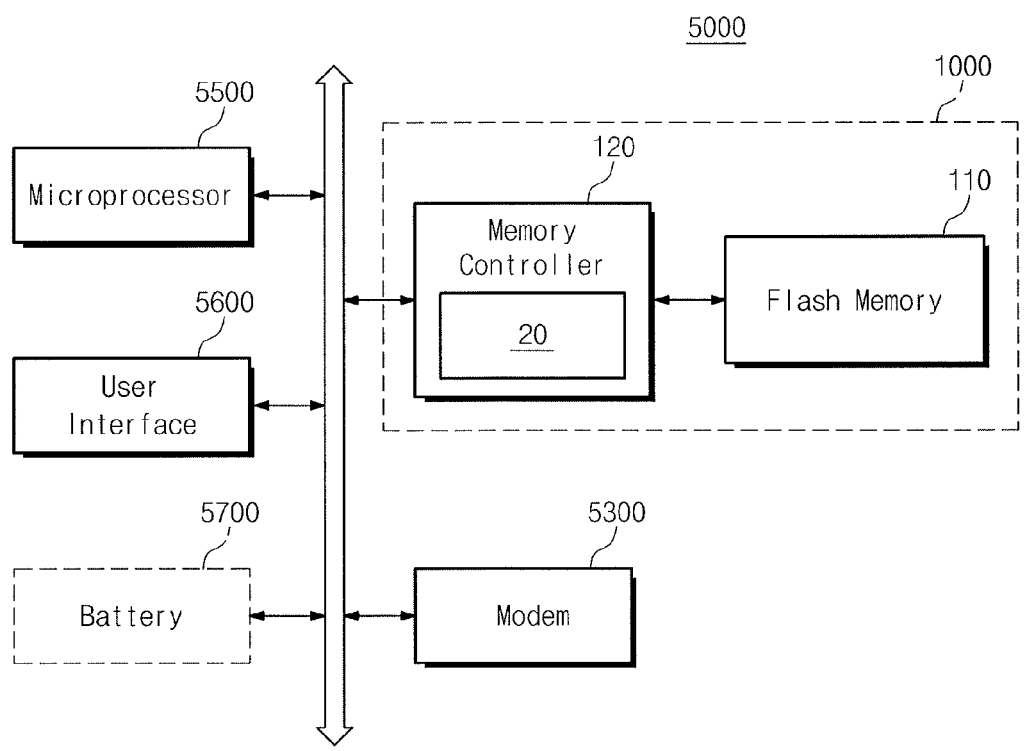
FIG. 11 illustrates a diagram showing a computing system including a storage device illustrated in FIG. 1.

FIG. 11 is a diagram showing a computing system including the storage device illustrated in FIG. 1.

Referring to FIG. 11, a computing system 5000 may include a flash memory 110, a memory controller 120, a modem 5300 such as a baseband chipset, a microprocessor 5500, and a user interface 5600.

The flash memory 110 may be a non-volatile memory device which retains data even at power-off. The flash memory 110 may be widely used as data storage and code storage for retaining stored contents at power-off. The flash memory 110 may be applied to mobile devices, e.g., cellular phone, PDA digital camera, portable gate console, and MP3P. The flash memory 110 may further be applied to home applications such as HDTV, DVD, router, and GSP.

The memory controller 120 may include a parallel stream filter 20 which performs a data processing operation, being executed by a host, in parallel. Operations and constitutions of the parallel stream filter 20 in FIG. 11 may be identical to those described in FIGS. 1 to 7. Further, the storage device 1000 illustrated in FIG. 11 may be configured to be identical to that illustrated in FIG. 1. It is well understood that it is possible to replace the storage device 1000 in FIG. 11 with one of the storage devices 2000, 3000, and 4000 in FIGS. 8 to 10. Accordingly, identical constituent elements may be represented by the same reference numerals, and description thereof is thus omitted.

The storage device 1000 in FIG. 11 may form a memory card, a memory card system a solid state drive/disk, etc. In this case, the memory controller 120 may be configured to communicate with an external device (e.g., a host) by one of various interface protocols such as an universal serial bus (USB) interface, an MultiMediaCard (MMC) interface, an PCIExpress (PCI-E) interface, a serial AT Attachment (SATA) interface, a parallel ATA (PATA) interface, a Small Computer System Interface (SCSI), a Serial Attached SCSI (SAS), an Enhanced Small Disk Interface (ESDI), an Integrated Drive Electronics (IDE) interface, etc.

In a case where the computing system 5000 is a mobile device, the computing system 5000 may further include a battery 5700 for supplying an operating voltage thereto. Although not illustrated in FIG. 11, the computing system 5000 may further comprise an application chipset, a camera image processor (CIS), a mobile DRAM, etc.

A flash memory and/or a memory controller according to exemplary embodiments may be packed using various types of packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), etc.

In an exemplary embodiment, memory cells are formed of one of various cell structures having a charge storage layer. Cell structures having a charge storage layer include a charge trap flash structure using a charge trap layer, a stack flash structure in which arrays are stacked in a multiple layer, a source-drain free flash structure, a pin-type flash structure, etc.

According to the embodiments described above, it is possible to process data in parallel by a plurality of stream filters within a storage device and to effectively merge results processed in parallel by the plurality of stream filters. As a result, a data processing function may be executed effectively within the storage device instead of a host. Thus, the burden of the host on data processing is reduced.

Exemplary embodiments have been disclosed herein, and although specific terms are employed, they are used and are to be interpreted in a generic and descriptive sense only and not for purpose of limitation.

What is claimed is:

1. A data processing method of a storage device including a host interface to interface with an external host, a plurality of non-volatile memories connected to a plurality of channels, and a controller connected between the host interface and the plurality of non-volatile memories and to control read, write, and erase operations of the plurality of non-volatile memories, the method comprising:

receiving filtering information from the external host; and performing a stream filtering operation on data by the controller of the storage device based on the filtering information, the filtering information including a filtering condition regarding the data, wherein:

the data includes a plurality of data streams transferred from the plurality of non-volatile memories to the controller of the storage device, and the streaming filtering operation is at least partially executed by the controller of the storage device instead of the external host such that an operation of transferring data from the plurality of non-volatile memories to the external host is reduced or skipped.

2. The data processing method of claim 1, wherein the filtering information includes a data format of data stored in the storage device.

3. The data processing method of claim 2, wherein the stream filtering operation includes searching data corresponding to the data format.

4. The data processing method of claim 2, wherein the stream filtering operation includes projecting data by using extracting data corresponding to the data format.

5. The data processing method of claim 1, wherein the filtering information includes a field being an object to be compared among data stored in the storage device and field information to be provided as a filtering condition result.

6. The data processing method of claim 2, wherein the stream filtering operation further includes merging virtual indexes corresponding to field information into one value.

7. The data processing method of claim 6, wherein the stream filtering operation further includes providing the merged result to the external host.

8. The data processing method of claim 1, wherein the stream filtering operation is independently performed by stream filters, the stream filters connected the plurality of the channels and included in the controller.

9. The data processing method of claim 1, wherein the stream filtering operation includes searching data corresponding to the filtering information among data stored in the non-volatile memories.

10. The data processing method of claim 1, further comprising concurrently receiving the plurality of data streams from respective non-volatile memories through corresponding channels.

11. The data processing method of claim 1, wherein the external host and the controller communicate with each other via at least one of a USB, SCSI, ESDI, SATA, SAS, PCI-express, or IDE interface.

12. A storage device connected to an external host, comprising:

a host interface to interface with the external host;

a plurality of non-volatile memory devices connected to a plurality of channels; and a controller connected between the host interface and the plurality of non-volatile memory devices and to control read, write, and erase operations of the plurality of non-volatile memory devices, wherein the controller of the storage device includes:

a filter manager to store filter information provided from the external host;

a plurality of stream filters to perform a stream filtering operation on data in response to the filtering information regarding the data;

a merge filter to merge data outputted from the stream filtering operation in response to a control of the filter manager, wherein:

the data includes a plurality of data streams transferred from the plurality of non-volatile memories to the controller of the storage device, and the streaming filtering operation is at least partially executed by the plurality of stream filters included in the controller of the storage device instead of the external host such that an operation of transferring data from the plurality of non-volatile memories to the external host is reduced or skipped.

13. The storage device of claim 12, wherein each of the plurality of stream filters includes a selection unit to search data corresponding to the filter information among the data stored in a corresponding to memory according to the control the filter manager.

14. The storage device of claim 12, wherein each of the plurality of stream filters includes a projection unit to extract data corresponding to the filter information among the data stored in a corresponding to memory according to the control the filter manager.

15. The storage device of claim 12, wherein each of the plurality of stream filters includes an aggregation unit to combine or calculate searched data or projected data by the plurality of the stream filters into a merged result according to the control the filter manager.

16. The storage device of claim 13, wherein each of the plurality of stream filters configures a virtual index on searched data or the projected data by the plurality of the stream filters under the control of the filter manager.

17. The storage device of claim 16, wherein the merge filter merges the virtual index configured to by the stream filters under the control of the filter manager.

18. The storage device of claim 12, wherein the stream filtering operation includes searching data corresponding to the filtering information among data stored in the non-volatile memory devices.

19. The storage device of claim 12, wherein the stream filters are in hardware.

20. The storage device of claim 12, wherein the stream filters are physically connected to the non-volatile memory devices through the corresponding channels, respectively.

21. The storage device of claim 12, wherein the external host and the controller communicate with each other via at least one of a USB, SCSI, ESDI, SATA, SAS, PCI-express, or IDE interface.

* * * * *